R. J. PRETTIE.
AUTOMATIC RECORD REPEATING MEANS FOR PHONOGRAPHS AND THE LIKE.
APPLICATION FILED JULY 31, 1915.

1,255,117.  Patented Jan. 29, 1918.
3 SHEETS—SHEET 1.

INVENTOR
Richard James Prettie
BY Ed Scherr Jr
ATTORNEY

R. J. PRETTIE.
AUTOMATIC RECORD REPEATING MEANS FOR PHONOGRAPHS AND THE LIKE.
APPLICATION FILED JULY 31, 1915.

1,255,117.

Patented Jan. 29, 1918.
3 SHEETS—SHEET 2.

INVENTOR
Richard James Prettie
BY
E. W. Scherr Jr.
ATTORNEY

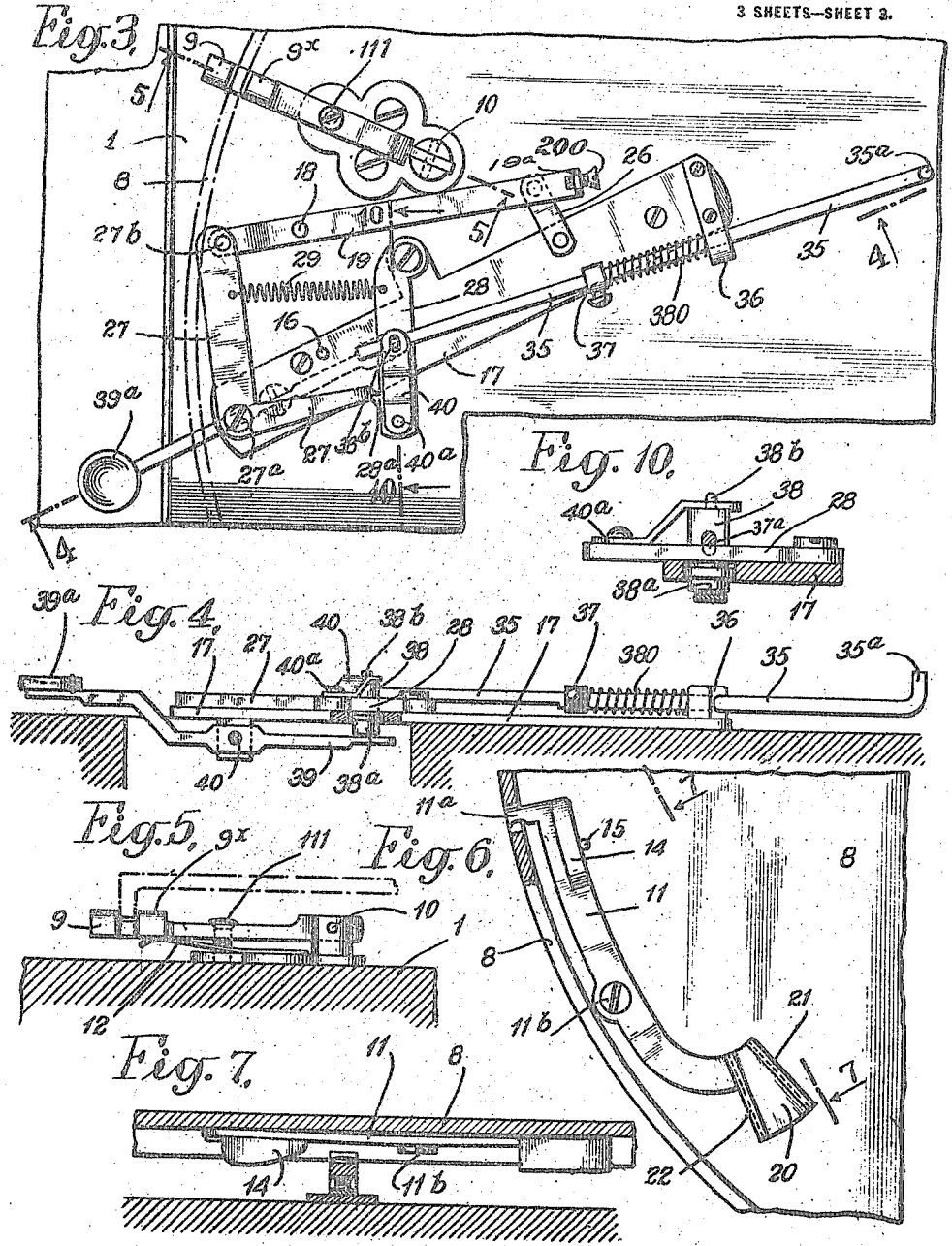

UNITED STATES PATENT OFFICE.

RICHARD JAMES PRETTIE, OF JAMAICA, NEW YORK, ASSIGNOR TO THE AEOLIAN COMPANY, A CORPORATION OF CONNECTICUT.

AUTOMATIC RECORD-REPEATING MEANS FOR PHONOGRAPHS AND THE LIKE.

1,255,117.   Specification of Letters Patent.   Patented Jan. 29, 1918.

Application filed July 31, 1915.   Serial No. 42,950.

*To all whom it may concern:*

Be it known that I, RICHARD JAMES PRETTIE, a citizen of the United States, residing at Jamaica, in the county of Queens and State of New York, have invented certain new and useful Improvements in Automatic Record-Repeating Means for Phonographs and the like, of which the following is a specification.

My present invention relates to automatic record-repeating means for phonographs and the like, the features and advantages of which will be apparent to those skilled in the art from the following description in connection with the drawings.

Figure 1:
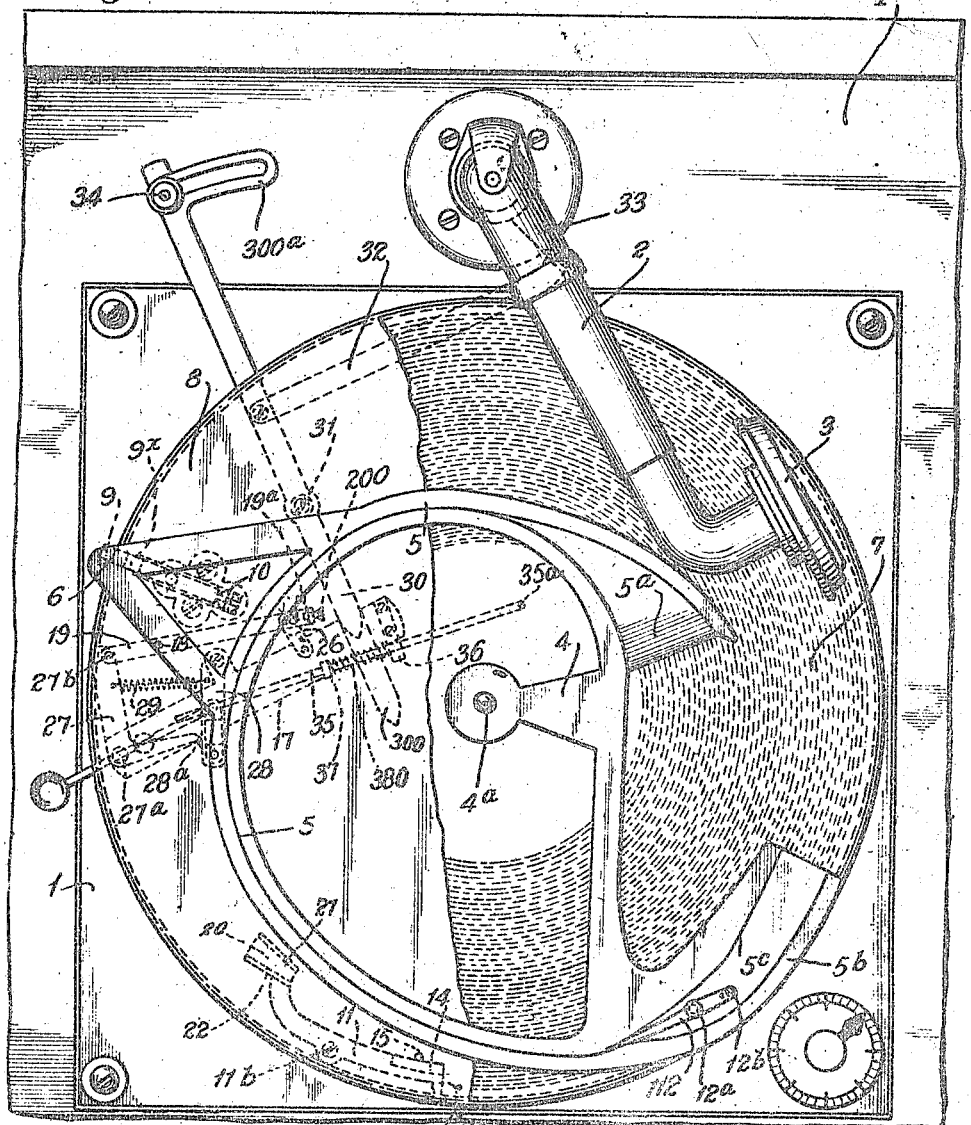
Figure 8:
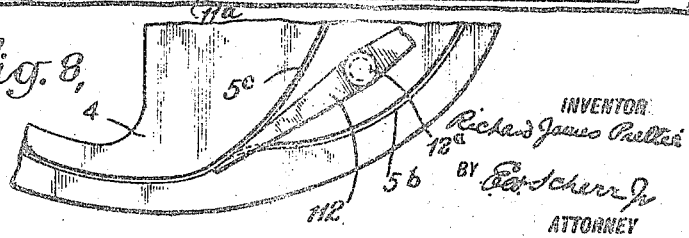
Figure 2:
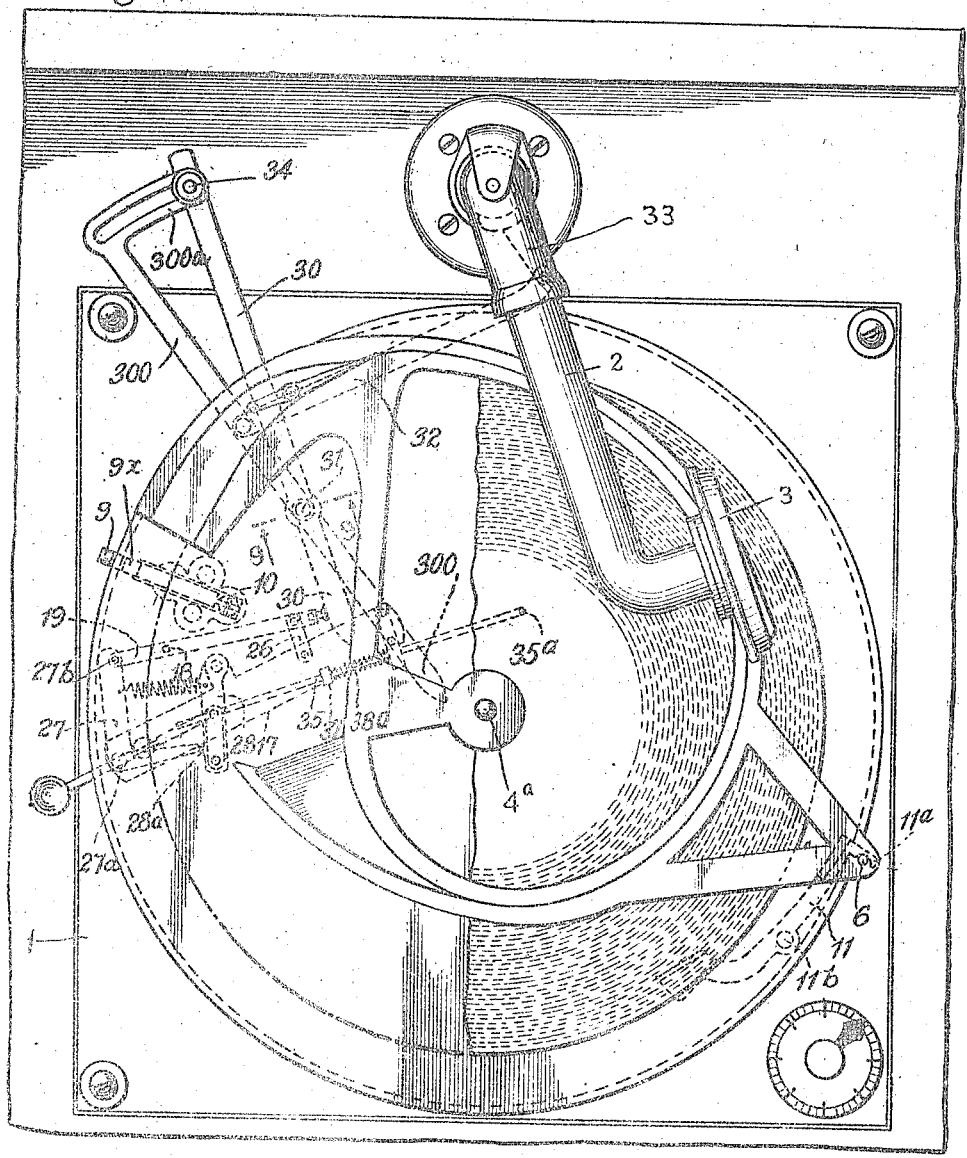
Figure 9:
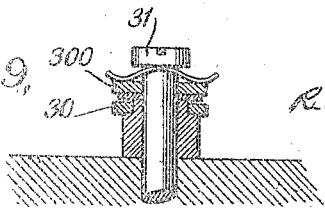

In the latter, Figure 1 is a plan view of a phonograph comprising one embodiment of my record-repeating means, said figure showing the parts in set position with the record playing; Fig. 2 is a similar view except that the parts are shown in tripped position with the needle and sound-box lifted off the record and in the act of being carried back by the conveyer to be replaced on the record at its starting point; this figure further illustrates a change in the adjustment of the device to make it do this for a smaller record, e. g. a 10 inch record, whereas Fig. 1 shows the adjustment for a 12 inch record. Fig. 3 is a plan view, on an enlarged scale, of the mechanism underlying the turn-table; Fig. 4 is a vertical section partly in elevation on the line 4—4 in Fig. 3 looking in the direction of the arrows; Fig. 5 is a similar view on the line 5—5 in said Fig. 3; Fig. 6 is an underneath fragmentary view of the turn-table on a larger scale to illustrate the movable dog carried thereby; Fig. 7 is a vertical section partly in elevation on the line 7—7 in Fig. 6 looking in the direction of the arrows; and Fig. 8 is an enlarged detail of Fig. 1, the switch member being shown adjusted as for a ten inch record, Fig. 9 is an enlarged sectional view on the line 9—9 in Fig. 2, looking in the direction of the arrows; and Fig. 10 is a vertical section on line 10—10 in Fig. 3.

I will now describe the specific devices of the drawings and their operation:—1 is the top of the motor and horn compartment of a phonograph, 2 is the tone-arm and 3 the sound-box shown supposedly in playing position with the needle on the record. 4 is a conveyer having a spiral groove 5 whose mouth $5^a$ is widened and downwardly beveled to scoop up the needle at any desired point near the end of record. The conveyer has a center hole $4^a$ through which freely passes the upper end of the turn-table spindle. The conveyer may be made of any suitable or desired material such as hard rubber, celluloid, fiber, metal etc. and is surfaced on the bottom with a thin layer of felt or the like which rests on the record 7 without scratching it.

During the time that the rotating record is playing or sounding, the conveyer is held stationary by a pin 6 (see left side of Fig. 1) which projects downwardly from it adjacent the rim of the turn-table 8, said pin being stopped by engaging with the stop member 9 as it tries to rotate with the conveyer 4 due to the latter's frictional contact with the record. This stop member 9 is on the board 1 and is further illustrated in Figs. 3 and 5 from which it will be seen that said member is pivoted at 10 for movement in a vertical plane. A headed pin or screw 111 passes freely through it and a spring 12 tends to keep it pressed upwardly against the head of said screw. There is a groove in the top of the stop member to receive into it the rim of the turn-table without touching it.

When the sound-box needle reaches the particular part of the record in front of the widened mouth $5^a$ of the conveyer groove which the operator has chosen for the record to end and the repeating operation to occur, then the latter automatically takes place, the operation consisting briefly in the conveyer 4 being positively driven from the turn-table after the stop 9 has been withdrawn, with the result that the conveyer makes one complete rotation and then is automatically checked again by the stop 9. During this rotation of the conveyer, the sound-box needle is first scooped off the record into the mouth $5^a$ of the conveyer groove and is then swung gradually outwardly until the end of the groove delivers the needle to the starting groove of the record whereupon the repetition or replaying of the record begins.

Continuing now with the description of the means by which this is accomplished:—

11 is a dog pivoted at $11^b$ to the underside of the turn-table. The toe $11^a$ of this dog is opposite an opening in the rim of the turn-table (Fig. 6) through which it is adapted to be projected as in Fig. 2 or withdrawn as in Fig. 1. A pin 15 on the turn-table acts to limit the in-position of the dog.

14 is a cam on the underside of the dog (Figs. 1 and 7) which in the out-position of the dog as in Fig. 2 rides over the high portion 9ˣ of the stop 9 and depresses said stop below the end of the pin 6 on the conveyer 4, so that both can rotate with the record beyond said stop. On the other hand, in the in-position of the dog, the cam 14 passes freely over the low part of the stop to the right of 9ˣ (Figs. 1 and 5) and consequently has no effect upon it.

The other end of the dog on its underside has a groove 20 located between two inclined walls 21 and 22. 18 is a pin projecting upwardly from an endwise movable part 19 (Figs. 1 and 3). This part 19 is adapted to be latched in an outer position wherein its pin 18 passes freely through the groove 20 of the dog 11 when the latter is in its in-position and is rotating with the turn-table. On the other hand, when unlatched, the part 19 is spring impelled inwardly a short distance so that its pin 18 now strikes against the wall 21 of the groove in the rotating dog and pivots its toe 11ᵃ outwardly into projecting position. Further it will be understood that means is provided for automatically latching the part 19 carrying the pin 18 in its aforesaid outer position whenever the sound-box needle is at or about the starting groove of the record; also for automatically unlatching said part whenever the needle of the sound-box reaches a predetermined sound-groove at or near the end of the record so that thereupon said part 19 is automatically impelled inwardly a short distance to carry the pin 18 into the above described position wherein it pivots the toe 11ᵃ of the dog outwardly.

With the foregoing in mind, the general mode of operation will now be clear. The conveyer 4 will be laid on the record as in Fig. 1 and the record started into rotation. The conveyer cannot rotate because its pin 6 abuts against the stop 9. The sound-box needle will then be brought out to the starting point of the record and lowered into contact. This will start the record playing and will at the same time latch the pin 18 in its outer position wherein it passes freely through the groove 20 in the rotating dog 11. These conditions continue until the record has been fully played up to the point previously predetermined by the operator (the means for this being later described) whereupon the needle will have reached one of the grooves in front of the mouth piece 5ᵃ. This will automatically unlatch the part carrying the pin 18 causing it to move into its inner position wherein it strikes against the wall 21 of the groove in the dog and forces its toe 11ᵃ into projecting position.

Just before this toe, as it rotates with the turn-table, picks up the pin 6 of the conveyer 4, said pin and conveyer are automatically released from the stop 9 by the cam 14 on the dog bearing down on the high part 9ˣ of the stop. The rotating toe 11ᵃ now picks up the pin 6 and rotates the conveyer positively with the turn-table and the record. The result is that the sound-box needle is scooped up by the conveyer and delivered at the outside of the record, which then begins to replay. At the same time, the aforesaid means later to be described latches the pin 18 back in its original position. In this position of the pin, the side 22 of the groove in the dog strikes against the pin 18 which swings the dog into its in-position, so that the conveyer is no longer positively driven by the dog but on the contrary is merely carried by frictional contact with the record for a short distance further until the pin 6 strikes against the stop 9. The record now continues playing, the pin 18 freely threading through the groove in the dog, until said pin is again automatically unlatched as before at the end of the record, whereupon the same cycle of operations occurs, and so on indefinitely.

Referring to Figs. 1 and 8, it will be noted that the delivery end of the conveyer groove 5 divides into two grooves, an outer groove 5ᵇ which delivers to the starting point of a large record, e. g. a 12 inch record, and the inner 5ᶜ which similarly delivers relative to a smaller or 10 inch record. 122 is a switch member pivoted to the conveyer member at 12ᵃ, a friction being provided so that it takes quite a little pressure on the operating handle 12ᵇ to swing it. It is so located that its free end can be adjusted to obstruct either of the delivery grooves 5ᵇ or 5ᶜ without obstructing the other. Fig. 1 shows it adjusted for repeating a 12 inch record, the sound-box needle being delivered by way of the outer groove 5ᵇ. Fig. 8 shows it adjusted for repeating a smaller record by way of the inner groove 5ᶜ.

I will now describe the aforesaid means for automatically latching and unlatching the part 19 bearing the pin 18, the latching occurring from the conveying of the sound box to the starting point and the unlatching from its reaching the predetermined end-point of the record:—26 is a link connecting the endwise movable part 19 with the stationary part 17. 27 is a bell-crank lever fulcrumed at 27ᵃ on the stationary part 17, one limb being pivotally connected at 27ᵇ to the part 19. The other limb extends toward a latch 28 which is pulled toward it by a tension spring 29 connecting the latch with the outer limb of the bell-crank. The latch 28 has a beveled latch-projection 28ᵃ adapted to interlock as shown in Figs. 1 or 3 with the toe of the bell-crank to hold the member 19 and its pin 18 releasably in their outermost position, wherein it will be remembered said pin passes idly through the groove 20 in the dog 11 when in its in-position of Fig. 1 or wherein it restores said dog to said in-position in case it is in its out-position shown in Fig. 2.

The part 19 has an upstanding end 19ª into which is tapped an adjustable screw 200; and the part 19 and its pin 18 are automatically latched in their aforesaid outermost position by the operating finger 30 pivoted at 31 to the board 1 being swung into contact with the screw 200 and forcing the part 19 endwise until the part 27 latches with the latch-part 28. This occurs whenever the conveyer 4 has fully delivered the sound-box to the starting point of the record due to the link connection 32 between a finger 300 subsequently referred to and a crank-arm 33 projecting radially from the vertical neck of the tone-arm 2.

Analogous to the finger 30 is the aforesaid finger 300 swinging freely on the same pivot 31 (Fig. 9). This finger 300 differs in having a longer toe portion and further in having a slotted head 300ª receiving the shank of a set-screw 34 tapped into the underlying other finger 30. Adjusting the set screw to the left end of the slotted head and tightening it, the two fingers 30 and 300 swing as one and due to the described operative connection with the tone-arm act to latch or set part 19 and pin 18 when the sound-box has been conveyed outwardly to one of the starting grooves of a large or 12 inch record; and vice versa acts to trip said latched part when the predetermined ending groove of the 12 inch record is reached.

On the other hand when the set-screw 34 is tightened at the right hand end of the slotted head 300ª as in Fig. 2, again the two operating fingers swing as one about their common pivot 31 but now they latch and unlatch the part bearing the pin 18 from the starting and ending positions respectively of the sound-box on a small or 10 inch record.

This unlatching means for both sized records comprises a piece 35 of round-wire having one end bent to form an upstanding projection 35ª. This member 35 is slidable endwise through a hole in a stationary lug 36 on the plate 17. 37 is a collar on the member 35 between which and the lug 36 is a compression spring 380 which gives the member a normal tendency to slide endwise toward the latch 28. The latch-end of the member 35 is flattened to give a flat-bottom thereto which rests slidably on top of the latch 28 and incidentally prevents the wire 35 from rotating in the lug 36 and so keeps the projection 35ª always upright. Said flattened end of the wire 35 threads through a vertically elongated eye 37ª in a pin 38 supported loosely for vertical adjustment in a hole through the latch 28 and a slightly larger hole through the base-plate 17. The head 38ª of the pin rests on the end of the finger lever 39 centrally pivoted at 40 between lugs on the underside of the base-plate 17. This portion of the finger lever with the related parts is located in a hole or recess in the board 1 (Fig. 4), whence the finger-end of the lever 39 projects and is provided with the button 39ª. 40 is a leaf-spring secured at one end 40ª to the latch 28 and at the other end being arranged to bear down on the pin 38 so that the member 35 is normally frictionally gripped and held stationarily between the top face of the eye 37ª in the pin and the top of the latch 28. To keep the parts in proper relationship, this spring 40 has a perforation into which projects a reduced portion 38ᵇ of the pin 38. This gripping action due to the spring 40 is released by depressing the aforesaid button 39ª because then the toe of the lever 39 lifts the pin 38 against the contrary action of the spring 40 and so releases the wire-member 35 from the grip between the top of the eye 37ª and the surface of the latch 28, whereupon the compression spring 380 is free to assert itself by impelling said wire member 35 endwise.

The operation of the aforesaid mechanism for unlatching the part 19 bearing the pin 18 so that the latter as described swings the dog 11 into its out-position and otherwise initiates the picking of the sound-box from the end of the record and its return to the starting point is as follows: When the sound-box has traveled sufficiently far toward the center of the record for the end of one of the fingers 30 or 300, swinging to the right in Fig. 1, to press against the projection 35ª on the member 35, it will pull said member endwise and release the latch 28 from the elbow-lever 27, whereupon the spring 29 will pull said lever and the part 19 bearing the pin 18 into their innermost position wherein said pin initiates the repeating operation.

Further be it noted that the operator can adjust the device so as to repeat as aforesaid at any given point in the end-part of the record. He will do this by first positioning the sound-box so that the stylus is located on the part of the record at which it is desired for the repeating operation to begin, and will then depress the button 39ª. Thereupon the spring 380 will impel the rod 35 endwise until its projection 35ª strikes against the operating finger 30 or 300 depending upon the size of the record being played. The operator will then release the button, which will result in the rod 35 being secured to the latch 28 with the projection 35ª located in just the right position to be pressed by the given operating finger when, in the subsequent playing of the record the stylus has reached the predetermined repeating position on the record. The operator will bring the sound box to the beginning point on the record and start it in rotation, whereupon for the reasons stated the record will automatically repeat itself indefinitely, the repeat each time being at the predetermined ending point.

What I claim is:—

1. In a phonograph repeat device, the combination, with a sound-box and a turn-table; of a conveyer rotatable about the same axis as the turn-table and adapted at the ending of the record to pick up the sound-box and bring it back to the beginning of the record; means for normally holding said conveyer against rotation; means for automatically releasing said holding means when the sound-box reaches the end of the record; and driving means carried by said turn-table for movement relative to the same into position to engage said conveyer after the latter has been released from said holding means, thereby to cause said conveyer to rotate in unison with said conveyer.

2. In a phonograph repeat device, the combination of an operatively supported sound-box, a normally stationary conveyer adapted at the ending of the record to rotate with it and to pick up the sound-box and convey it to the beginning of the record, a releasable stop normally holding the conveyer stationary as aforesaid, a dog on the turn-table movable into and out of driving engagement with the conveyer, and means automatically operated when the sound-box reaches the end of the record to move the dog into driving engagement with the conveyer and also to release the stop.

3. In a phonograph repeat device, the combination of an operatively supported sound-box, a normally stationary conveyer adapted at the ending of the record to rotate with it and to pick up the sound-box and convey it to the beginning of the record, a releasable stop normally holding the conveyer stationary as aforesaid, a dog on the turn-table movable into and out of driving engagement with the conveyer, said dog when in driving position acting also to release the stop, and means automatically operated from the position of the sound-box to move the dog into its conveyer-engaging position when the sound-box is at the end of the record, and to move the dog out of its conveyer-engaging position when the conveyer has reset the sound-box at the beginning of the record.

4. In a phonograph repeat device, the combination of an operatively-supported sound-box and a stylus carried thereby, a conveyer rotatable with the record and having a groove adapted to pick up the stylus at the end of the record and deliver the same to the beginning of the record, said groove dividing at its delivery end into two grooves, an inner and an outer adapted to different sized records, and switch means on the conveyer adjustable to guide the stylus into either delivery groove to the exclusion of the other.

5. In a phonograph repeat device, the combination, with a sound-box and a turn-table; of a conveyer rotatable about the same axis as the turn-table and adapted at the ending of the record to pick up the sound-box and bring it back to the beginning of the record; a depressible stop normally engaged with said conveyer to hold it against rotation; and means automatically operated when the sound-box reaches the end of the record for depressing said stop, thereby to positively disengage it from said conveyer.

6. In a phonograph repeat device, the combination, with a sound-box and a turn-table; of a conveyer rotatable about the same axis as the turn-table and adapted at the ending of the record to pick up the sound-box and bring it back to the beginning of the record; a depressible stop normally engaged with said conveyer to hold it against rotation; means automatically operated when the sound-box reaches the end of the record for depressing said stop, thereby to positively disengage it from said conveyer; and means for thereafter automatically coupling said conveyer to rotate in unison with said turn-table.

7. In a phonograph repeat device, the combination, with a sound-box and a turn-table; of a conveyer rotatable about the same axis as the turn-table and adapted at the ending of the record to pick up the sound-box and bring it back to the beginning of the record; a stationary member secured to said conveyer; a stop normally engaged with said member to hold said conveyer against rotation; and means for automatically disengaging said stop from said member when the sound-box reaches the end of the record.

8. In a phonograph repeat device, the combination, with a sound-box and a turn-table; of a conveyer rotatable about the same axis as the turn-table and adapted at the ending of the record to pick up the sound-box and bring it back to the beginning of the record; a stationary member secured to said conveyer; a stop normally engaged with said member to hold said conveyer against rotation; means for automatically disengaging said stop from said member when the sound-box reaches the end of the record; and a coupler carried by the turn-table for engagement with said member after the latter has been released by said stop, thereby to cause said conveyer to rotate in unison with said turn-table.

9. In a phonograph repeat device, the combination, with a sound-box and a turn-table; of a conveyer rotatable about the same axis as the turn-table and adapted at the ending of the record to pick up the sound-box and bring it back to the beginning of the record; a stationary member secured to said conveyer; a stop normally engaged with said member to hold said conveyer against rotation; means for automatically disengaging said stop from said member when the sound-box reaches the end of the record; a coupler carried by said turn-table for engagement with said member to cause said conveyer to rotate in unison with said turn-table, but normally disposed in ineffective position for said engagement; and means for automatically shifting said coupler relatively to said turn-table into position to engage said member when the sound-box reaches the end of the record.

In testimony whereof, I have signed my name to this specification this 30th day of July, 1915.

RICHARD JAMES PRETTIE.